United States Patent [19]
Henriques

[11] Patent Number: 5,564,221
[45] Date of Patent: Oct. 15, 1996

[54] ANIMAL TRAP ENTRANCE DEVICE

[76] Inventor: Joseph Henriques, 80 Beardsley Rd., New Milford, Conn. 06776

[21] Appl. No.: 512,970

[22] Filed: Aug. 9, 1995

[51] Int. Cl.$^6$ .................................................. A01M 23/08
[52] U.S. Cl. ........................................ 43/61; 43/66
[58] Field of Search ...................... 43/60, 61, 64, 43/65, 66

[56] References Cited

U.S. PATENT DOCUMENTS

| | | | |
|---|---|---|---|
| 198,064 | 12/1877 | Adkins | 43/61 |
| 944,926 | 12/1909 | Turnbo | 43/66 |
| 1,226,641 | 5/1917 | Cushing | 43/60 |
| 1,381,464 | 6/1921 | Hulsmann | 43/66 |
| 1,860,599 | 5/1932 | Schiltz | 43/66 |
| 1,868,847 | 7/1932 | Pearson | 43/66 |
| 2,231,191 | 2/1941 | Martino | 43/66 |
| 3,681,869 | 8/1972 | Barker | 43/66 |
| 3,786,591 | 1/1974 | Morford | 43/66 |
| 4,251,944 | 2/1981 | Fulopp | 43/66 |
| 4,768,305 | 1/1988 | Sackett | 43/61 |
| 5,067,271 | 11/1991 | Henning | 43/60 |

FOREIGN PATENT DOCUMENTS

| | | |
|---|---|---|
| 932190 | 3/1948 | France. |
| 17092 | of 1891 | United Kingdom. |

Primary Examiner—Joseph J. Hail, III
Assistant Examiner—Jay A. Stelacone
Attorney, Agent, or Firm—Ware, Fressola, Van Der Sluys & Adolphson

[57] ABSTRACT

An animal trap entrance device for attachment to a container, so as to form an animal trap, is provided. The device includes a tube, a moveable member and moveable member stop disposed within the tube and a fitting attached to the outside of the tube for mating the device to the container.

20 Claims, 3 Drawing Sheets

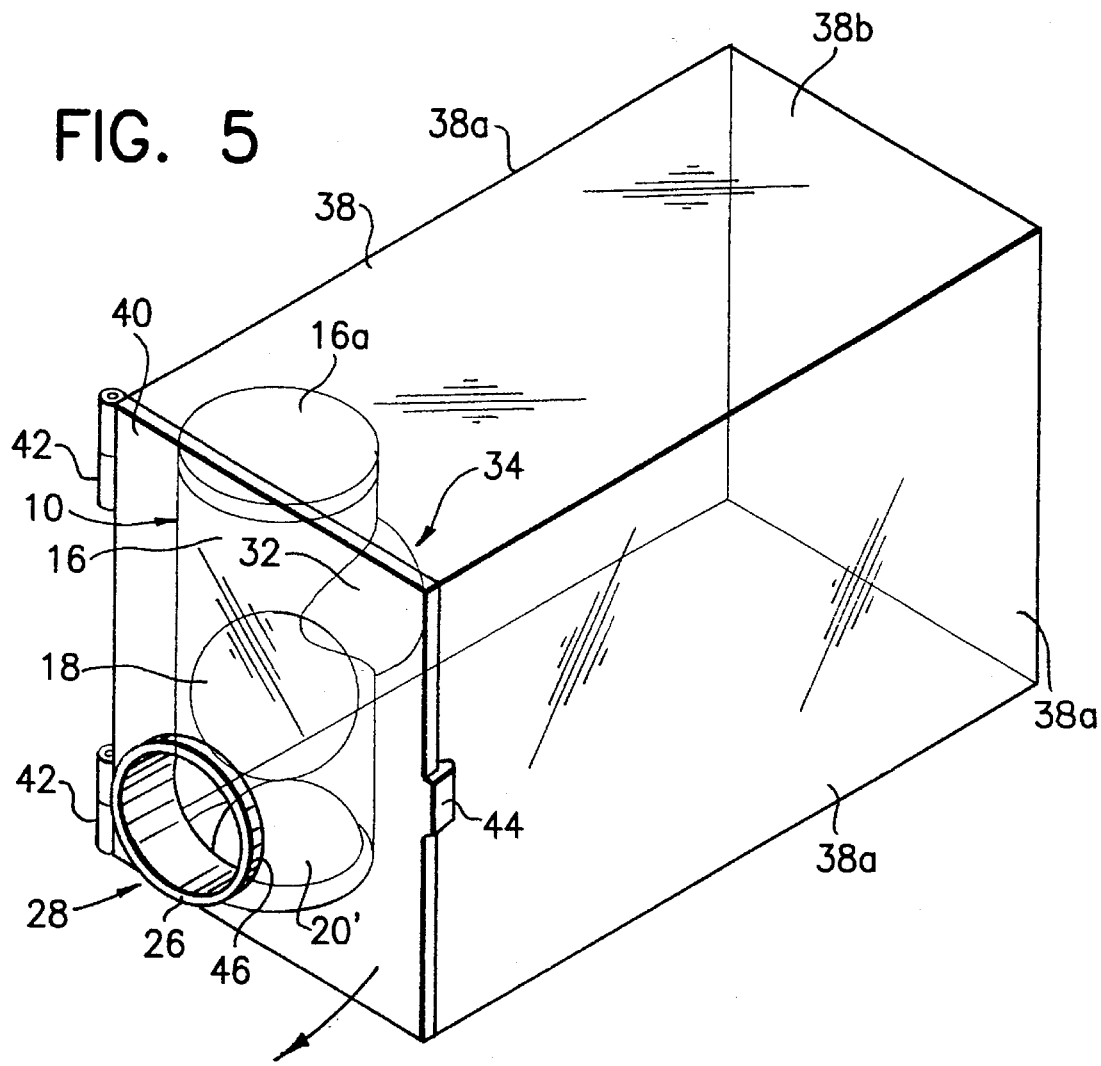

ANIMAL TRAP ENTRANCE DEVICE

BACKGROUND OF THE INVENTION

1. Field of the Invention

The present invention relates to an animal trap entrance device for attachment to a container, so as to form an animal trap.

2. Description of the Prior Art

It is well known that small animals, such as rats, mice and other rodents, will push objects out of their way with their noses while searching for food. Consequently, ball-type animal traps generally take advantage of this tendency by providing a ball which can be "nosed" along a predetermined path to gain access to bait, but which will also cut off an exit route. Such traps are well known in the art and have been used for many years. Early designs typically incorporated a ball placed on an inclined track, which when disturbed by an animal entering the trap, would roll down the track to seal the animal's only escape route. However, these early designs were typically "one shot" designs, requiring that the ball be manually reset to the top of the track each time the trap was used. Consequently, these traps could only capture a single animal at a time.

For example, British Patent No. 17,092, issued to Webber on Oct. 8, 1891, discloses an early inclined plane ball trap, which when triggered, causes a ball to roll down an inclined plane to block the trap entrance. The ball must be manually reset to the top of the inclined plane after each use.

More advanced designs oriented the track so that the traps would be automatically reset after each use. For example, U.S. Pat. No. 944,926 issued to Turnbo on Jan. 4, 1909, discloses a ball type rat trap incorporating a pivoting platform on which a ball rolls to block the exit of a trapped animal. The trap includes a series of interlocking chambers which, in combination with the pivoting platform, provides for the automatic resetting of the trap and thus the trapping of multiple animals.

More recent developments include the use of a ball and inclined tube. For example, U.S. Pat. No. 3,681,869 issued to Barker on Aug. 8, 1972, discloses an animal trap including a box, an inclined tube mounted in the box and a ball located inside the tube. An animal entering one end of the tube rolls the ball up the inclined tube to gain access to the trap compartment through an aperture in the tube. Once the animal enters the trap compartment through the aperture, the ball rolls back to the initial position, blocking the animal's escape.

Notwithstanding the low cost and simplicity of design advantages that the ball and tube traps offer over earlier designs, they are not without their disadvantage. All of the ball and inclined tube configurations are based on free rolling movement of the ball within the inclined tube to trap the animal. However, trapped animals tend to defecate abundantly inside the trap and tube, which eventually impedes the free rolling motion of the ball within the tube. In the worst case, the trap will no longer automatically reset and may not even prevent the escape of trapped animals. Moreover, the clogged tubes can be difficult to clean, particularly when they are permanently attached to the animal container or permanently integrated into the trap.

In addition to the problems caused by clogged tubes, a trapped animal can be difficult to remove from a trap when the ball and inclined tube are permanently attached to the container in which the trapped animal is held. Trapped animals will often re-enter the tube when the trap container is opened, making their removal particularly difficult.

Finally, all these prior art traps include both the entrance mechanism and the animal container. However, virtually every household has many soft drink containers, which could hold an animal if a mechanism existed for trapping an animal into the container.

Consequently, an animal trap entrance device which can be attached to a disposable container to form an animal trap, which is inexpensive and simple to manufacture, which will automatically reset after capturing an animal and which does not rely on the rolling movement of a ball within a tube is highly desirable.

SUMMARY OF THE INVENTION

The present invention is designed to overcome the limitations inherent in the various animal trap configurations discussed above and toward this end it includes a novel animal trap entrance device for attachment to a container, so as to form an animal trap.

An object of the present invention is to provide an animal trap entrance device which is automatically reset after capturing an animal, providing the capability to capture more than one animal at a time.

Another object of the present invention is to provide an animal trap entrance device which does not rely on the rolling motion of a ball in a tube.

Yet another object of the present invention is to provide an animal trap entrance device which can be easily attached to a variety of containers and which can be easily detached from a container once an animal has been trapped inside the container.

The foregoing objects are accomplished, at least in part, by an animal trap entrance device for attachment to a container so as to form an animal trap. The device includes a tube, a moveable member disposed within the tube, a moveable member stop mounted inside the tube and a fitting attached to the outside of the tube.

The tube includes an entrance aperture formed therein at a first, lower, location and an exit aperture formed therein at a second, upper, location.

The moveable member is dimensioned for movement within the tube, so as to be interposed between the entrance aperture and exit aperture when it is in a first, rest position.

The moveable member stop is mounted inside the tube near the entrance aperture for displacing the moveable member from the entrance aperture when the moveable member is in the first, rest position.

The fitting is attached to the outside of the tube and covers the exit aperture for attaching the device to the container.

With this combination, the moveable member rests against said moveable member stop in the first, rest position, partially covering said entrance aperture, when the device is oriented with the exit aperture elevated above the entrance aperture. This prevents an animal located within the container or tube from exiting the tube through the entrance aperture. More importantly, it permits an animal, located outside the device and being attracted to bait contained within the container, to enter the tube through the entrance aperture. Entering the tube, the animal moves or "noses" the moveable member from the first, rest position to a second position, so as to gain access to and enter the container through the exit aperture. After entering the container, the moveable member falls back to the first, rest position, thereby trapping the animal in the container and resetting the device so that additional animals may be trapped in the same manner.

The present invention offers several advantages over the prior art. First, the present invention provides an animal trap entrance device which is automatically reset after an animal is captured so that additional animals may be captured. In addition, the device of the present invention does not rely on a rolling ball to trap animals making it less susceptible to being rendered inoperable by the buildup of animal feces. Finally, the device can be attached to a variety of containers for holding the trapped animals, minimizing the buildup of animal waste in the entrance device itself and providing for convenient disposal or release of the animals, while minimizing the cost to fabricate the device.

Other objects and advantages will become apparent to those skilled in the art from the following detailed description read in conjunction with the appended claims and drawings attached hereto.

BRIEF DESCRIPTION OF THE DRAWINGS

The drawings, not drawn to scale, include:

FIG. 5 is a second embodiment of the device according to the present invention of FIG. 1.

BEST MODE FOR CARRYING OUT THE INVENTION

Figure 1:
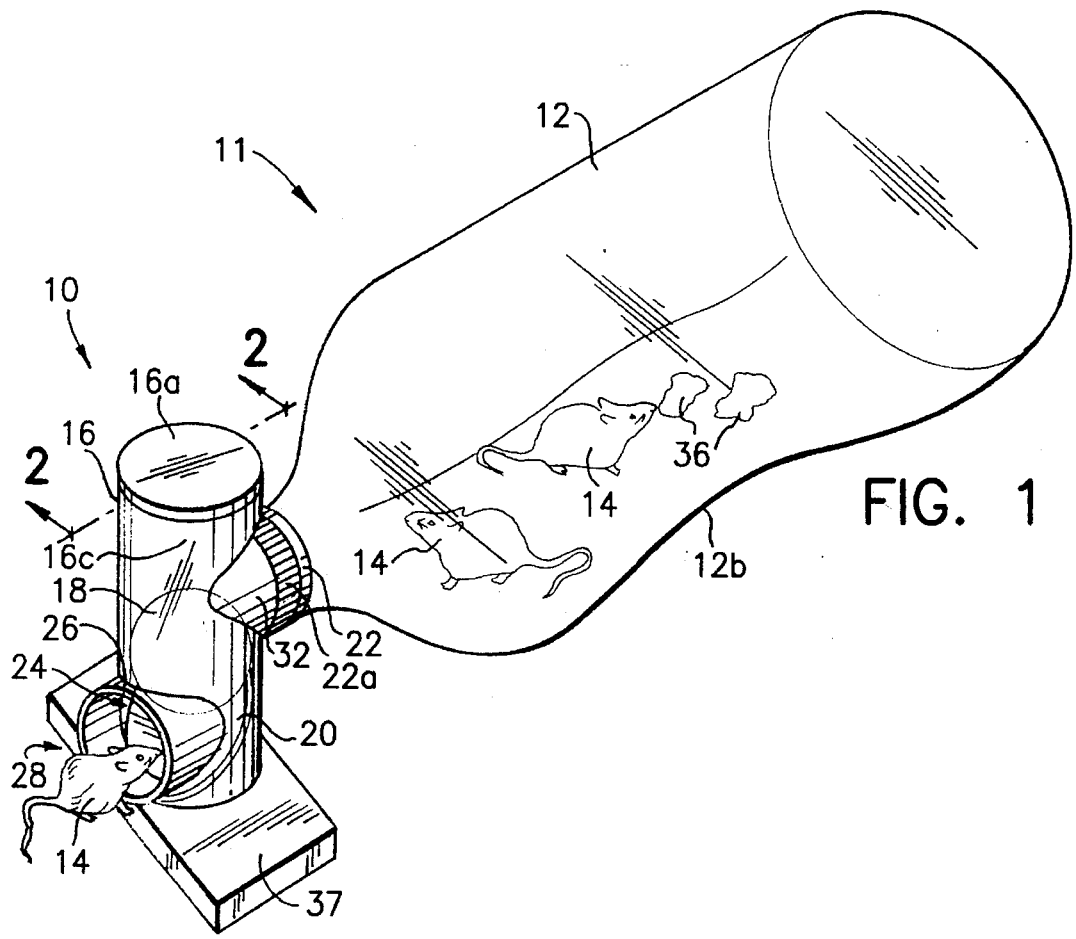
FIG. 1 is a perspective view of an animal trap entrance device embodying the principles of the present invention, showing its use with a container to form an animal trap.

Referring first to FIG. 1, there is illustrated an animal trap entrance device of the present invention, generally indicated by the numeral 10, attached to a container 12, so as to form an animal trap 11 for trapping animals 14. The device 10 includes a tube 16, a moveable member 18 disposed within the tube 16, a moveable member stop 20, also disposed within the tube 16 and a fitting 22, attached to the tube 16, for mating the device 10 with the container 12.

As illustrated in FIGS. 1–5, the tube 16 has a first end 16a, a second end 16b and a middle section 16c Although the first end 16a and second end 16b of the tube 16 are shown in the drawings as closed, it should be understood that they need only be closed to the extent necessary to keep the moveable member 18 within the tube 16. For example, the first end 16a and the second end 16b may be partially open, perforated or covered with a wire mesh. The tube 16 may also include other perforations or openings.

The tube 16 includes an entrance aperture 24 located near the first end 16a, which provides access to the tube 16. An entrance structure 26 is attached to the outside of the tube 16 and protrudes outwardly. The entrance structure 26 surrounds the entrance aperture 24, so as to form an entrance portal 28 through which an animal 14 enters the device 10. The tube 16 also includes an exit aperture 30, located near the middle section 16c of the tube 16, substantially opposite from the entrance aperture 24. An exit structure 32 is attached to the outside of the tube 16 protruding outwardly and surrounding the exit aperture 30 to form an exit portal 34.

Although the entrance aperture 24 and exit aperture 30 are illustrated in the figures as being diametrically opposed, it should be understood that they may be positioned at various other angles with respect to each other without departing from the scope of the present invention.

The tube 16 can be made from a variety of materials including metal, plastic, composite or other material. A transparent material such as clear plastic is desirable because it allows a user to observe the presence of any animals 14 in the device 10.

Figure 2:
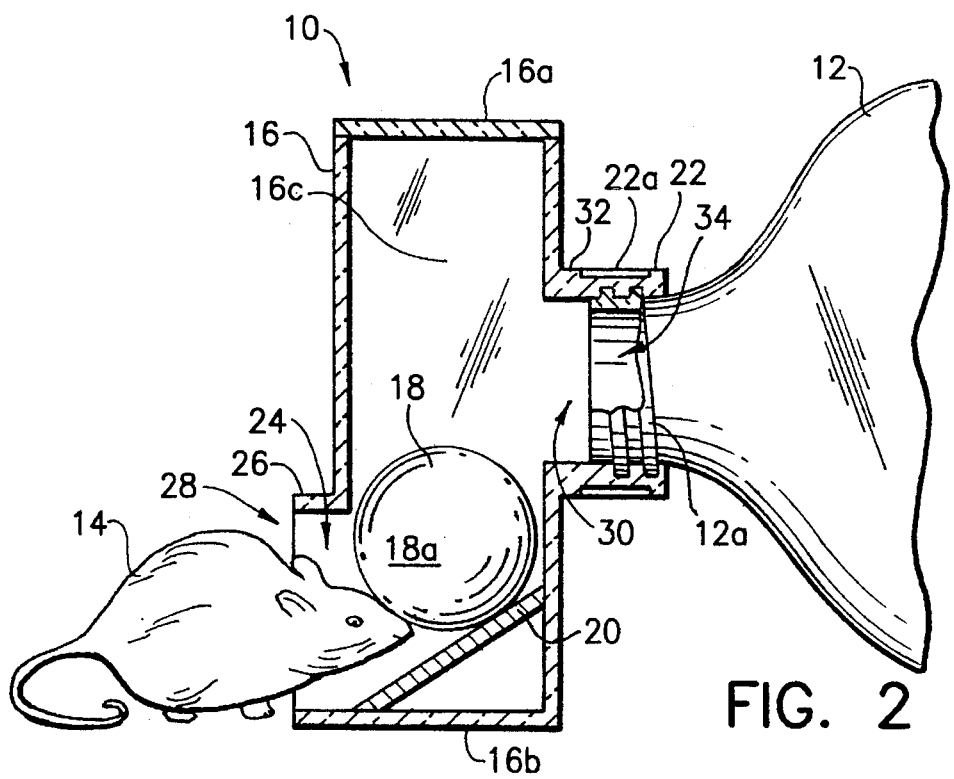
FIG. 2 is a cross-sectional view taken along line 2—2 of FIG. 1, showing the moveable member in the first, lower (closed) position.
Figure 3:
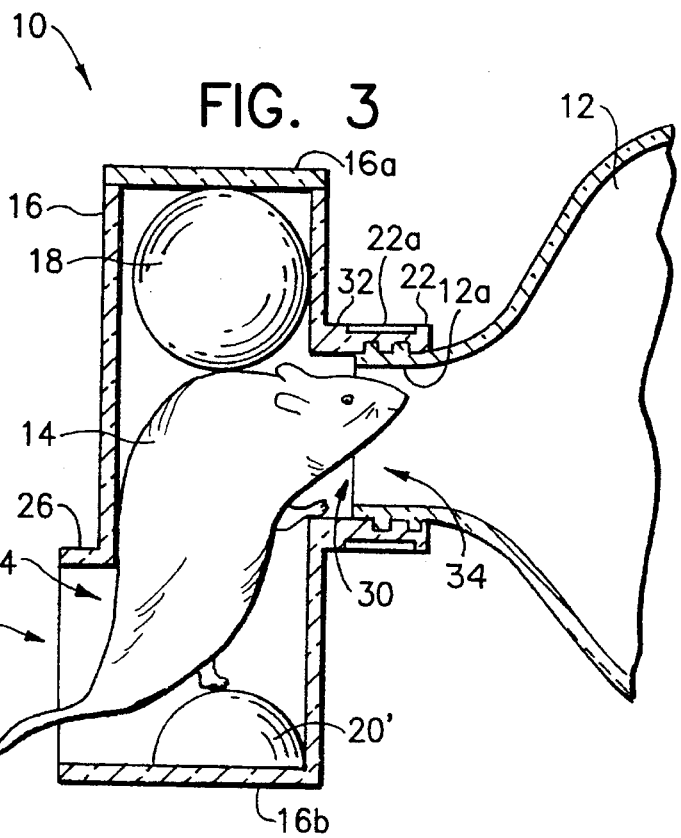
FIG. 3 is a cross-sectional view taken along line 2—2 of FIG. 1, showing the moveable member in the second (open) position.
Figure 4:
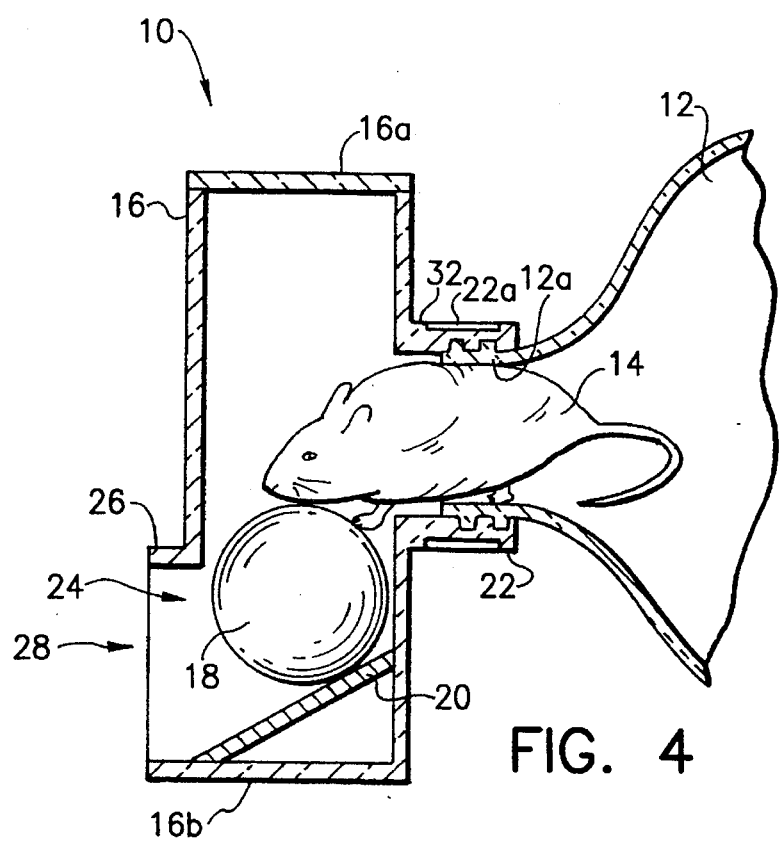
FIG. 4 is a cross-sectional view taken along line 2—2 of FIG. 1, showing the moveable member in the first, lower position after an animal has been trapped.

As illustrated in FIGS. 1–5, the moveable member 18 is disposed within the tube 16 and dimensioned for movement between a first, lower position, near the first end 16a and a second position near the second end 16b. When the moveable member 18 is in the first, lower position, as best shown in FIGS. 2 and 4, it rests against the moveable member stop 20 and partially covers the entrance aperture 24. In this position, an animal 14, located outside the device 10 and searching for food 36 located in the container, must displace the moveable member 18 from the first, lower position to enter the device 10.

Animals 14, such as mice, rats or other rodents, sensing that food 36 is nearby, will tend to "nose" objects out of their way to locate the food 36. Consequently, sensing the odor of the food 36, contained in the container 12, an animal 14 will begin to push the moveable member 18 up the tube 16. When the moveable member 18 has been pushed to the second position, as shown in FIG. 3, the exit aperture 30 is uncovered, providing access to the container 12 and the food 36 contained therein. Once the animal 14 enters the container 12, the moveable member 18 returns to the first position, blocking the animal's 14 escape.

It should be understood that the moveable member 18 may be formed in a variety of shapes and perform its intended function as described above. For example, even though the moveable member 18 is shown in the figures as spherically shaped, it may be cylindrical or rectangular in shape, so long as it can move freely within the tube 16. A tight tolerance between the moveable member 18 and the walk of the tube 16 is not required. To the contrary, a loose fit is generally preferable because the device is then less affected by the presence of animal feces. Preferably, the moveable member 18 is spherically shaped as shown, or at least has a rounded portion 18a, as shown in FIG. 2, to allow the animal 14 to move more freely within the tube 16. Nevertheless, the moveable member 18 does not have to roll within the tube 16.

As best shown in FIGS. 2–4, the moveable member stop 20 is mounted inside the tube 16 at the first end 16a for displacing the moveable member 18 with respect to the entrance aperture 26 and entrance portal 28 so that the animal 14 may position its nose underneath the moveable member 20. As shown in FIGS. 1, 2 and 3, the moveable member stop 20 is a ramp, on which the moveable member 18 rests, allowing the animal 14 to easily get its nose under the moveable member 18. As an alternative, as shown in FIGS. 3 and 5, the moveable member stop, having reference numeral 20', may be generally hemi-spherical in shapes. Of course, many other shapes may be selected without departing from the scope of the present invention.

As shown in FIGS. 1–4, the fitting 22 is attached to the exit projection 32 of the tube 16 and provides for the mating of the device 10 and an open end of the container 12. The inside surface of the fitting 22 is threaded for receiving a corresponding threaded male portion 12a of the container 12. Alternatively, the device 10 may be force fitted inside the threaded male portion 12a of a container 12 which has a so called "wide-mouth" opening. As best shown in FIG. 1, the fitting 22 also includes a ribbed outer surface 22a for providing a better grip when attaching the device 10 to the container 12.

As shown in FIG. 1, in the event the container 12 has a radius substantially greater than the distance between the exit aperture 30 and the second end 16b of the tube, the container 12 may include a flat section to prevent the container 12 and entrance device 10 from rolling. Containers such as the commonly available 2 liter size are easily deformed so as to form a flat portion on the bottom. Alternatively, as shown in FIG. 1, a base plate 37 may be attached to the second end 16b of the tube 16 for stabilizing the device 10 when attached to the container 12. The base plate 37 is generally rectangular in shape and may be snap fit or permanently attached to the second end 16b of the tube 16.

Another embodiment of the present invention is illustrated in FIG. 5 which includes the device 10 as described above enclosed in a housing 38. The housing 38 includes a door 40 which is attached to the housing 38 with hinges 42. The door 40 includes a latch 44 which engages a notch (not shown) in the housing 38 for holding the door 40 in a closed position. The door 40 also includes a device mounting aperture 46, into which the device 10 is mounted in a substantially vertical orientation. The device mounting aperture 46 is sized to receive the entrance projection 26 of the device 10.

With this combination, an animal 14, (not shown in FIG. 5) being attracted to food 36 (not shown in FIG. 5) contained within the housing 38 and entering the device 10, as described above, will be trapped inside the housing 38. As would be appreciated by one skilled in the art, the housing 38 may be made from a variety of materials including glass, plastic, metal or other suitable material. However, it may be preferable to have the housing walls 38a and the door 40 made from an opaque material and the housing top 38b made from a transparent material, in the event the sight of a trapped animal would be upsetting to a bystander. The housing top 38b would allow an individual to visually check if any animals 14 are trapped.

As will be appreciated from the description provided herein, the present invention provides an effective animal trap entrance device for attachment to a container so as to form an animal trap. Although the present invention has been described and discussed herein with respect to at least one embodiment, other arrangements or configurations may also be used that do not depart from the spirit and scope hereof. Hence, the present invention is deemed limited only by the appended claims and the reasonable interpretation thereof.

What is claimed is:

1. An animal trap entrance device for attachment to a container having an opening formed therein, so as to form an animal trap therewith, said animal trap entrance device comprising:

A) a tube having an entrance aperture formed therein at a first location and an exit aperture formed therein at a second location;

B) a moveable member disposed within said tube and dimensioned for movement within the tube, so as to be interposed between the entrance aperture and the exit aperture when said moveable member is in a first position;

C) a moveable member stop mounted inside said tube near the entrance aperture; and D) a fitting attached to said tube and covering the exit aperture for mating said animal trap entrance device to the opening of the container, whereby said moveable member rests against said moveable member stop in the first position, so as to at least partially cover the entrance aperture when said device is oriented substantially vertically with said exit aperture elevated higher than said entrance aperture, said device permitting an animal located outside said device, being attracted to bait contained within the container, to enter said tube through the entrance aperture, move said moveable member from the first position to a second position, so as to gain access to and enter the container through the exit aperture, after which, said moveable member returns to the first position, thereby trapping the animal in the container and resetting said device so that additional animals may be trapped in the same manner.

2. The animal trap entrance device in accordance with claim 1, wherein said moveable member is a ball.

3. The animal trap entrance device in accordance with claim 1, wherein said moveable member stop is a ramp.

4. The animal trap entrance device in accordance with claim 1, wherein first and second ends of said tube are at least partially closed so as to contain in said tube said moveable member and any animals located within said tube.

5. The animal trap entrance device in accordance with claim 1, wherein the opening of the container is threaded and wherein said fitting is threaded for threaded engagement with the threaded opening of the container.

6. The animal trap entrance device in accordance with claim 1, wherein said device further includes a base plate, attached to said tube for stabilizing said device when attached to the container.

7. The animal trap entrance device in accordance with claim 1, wherein said moveable member is a ball and wherein said moveable member stop is a ramp.

8. The animal trap entrance device in accordance with claim 1, wherein said moveable member is a ball, wherein said moveable member stop is a ramp and wherein said device is made from a transparent material.

9. The animal trap entrance device in accordance with claim 1, wherein said moveable member is a ball, wherein said device is made from a transparent material and wherein first and second ends of said tube are at least partially closed so as to contain in said tube said moveable member and any animals located within said tube.

10. The animal trap entrance device in accordance with claim 1, wherein the opening of the container is threaded, wherein said moveable member is a ball, wherein said moveable member stop is a ramp and wherein said fitting is threaded for threaded engagement with the threaded opening of the container.

11. The animal trap entrance device in accordance with claim 1, wherein said moveable member is a ball, wherein said moveable member stop is a ramp, and wherein said device further includes a base plate, attached to said tube for stabilizing said device when attached to the container.

12. An animal trap entrance device for attachment to a container having an opening formed therein, so as to form an animal trap therewith, said animal trap entrance device comprising:

A) a tube having an entrance aperture formed therein at a first location and an exit aperture formed therein at a second location, said tube further having a closed end;

B) a moveable member disposed within said tube and dimensioned for movement within the tube, so as to be interposed between the entrance aperture and the exit aperture when said moveable member is in a first position;

C) a moveable member stop mounted inside said tube near the entrance aperture; and D) a fitting attached to said tube and covering the exit aperture for mating said animal trap entrance device to the opening of the container, whereby said moveable member rests against said moveable member stop in the first position, so as to at least partially cover the entrance aperture when said device is oriented with said exit aperture elevated higher than said entrance aperture, said device permitting an animal located outside said device, being attracted to bait contained within the container, to enter said tube through the entrance aperture, move said moveable member from the first position to a second position, so as to gain access to and enter the container through the exit aperture, after which, said moveable member returns to the first position, thereby trapping the animal in the container and resetting said device so that additional animals may be trapped in the same manner.

13. The animal trap entrance device in accordance with claim 12, wherein said moveable member is a ball.

14. The animal trap entrance device in accordance with claim 12, wherein said moveable member stop is a ramp.

15. The animal trap entrance device in accordance with claim 12, wherein the opening of the container is threaded and wherein said fining is threaded for threaded engagement with the threaded opening of the container.

16. The animal trap entrance device in accordance with claim 12, wherein said device further includes a base plate, attached to said tube for stabilizing said device when attached to the container.

17. The animal trap entrance device in accordance with claim 12, wherein said moveable member is a ball, wherein said moveable member stop is a ramp and wherein said device is made from a transparent material.

18. The animal trap entrance device in accordance with claim 12, wherein said moveable member is a ball, wherein said device is made from a transparent material.

19. The animal trap entrance device in accordance with claim 12, wherein the opening of the container is threaded, wherein said moveable member is a ball, wherein said moveable member stop is a ramp and wherein said fitting is threaded for threaded engagement with the threaded opening of the container.

20. The animal trap entrance device in accordance with claim 12, wherein said moveable member is a ball, wherein said moveable member stop is a ramp, and wherein said device further includes a base plate, attached to said tube for stabilizing said device when attached to the container.

* * * * *